(12) United States Patent
Sharma et al.

(10) Patent No.: US 12,406,051 B2
(45) Date of Patent: Sep. 2, 2025

(54) PASSWORD MANAGEMENT OF VIRTUAL MACHINES FOR MIGRATION SUPPORT

(71) Applicant: VMware LLC, Palo Alto, CA (US)

(72) Inventors: Dinesh Sharma, Bangalore (IN); Amiya Sahu, Bangalore (IN); Himanshu Garg, Bangalore (IN); Jeffrey W. Sheldon, Los Altos, CA (US)

(73) Assignee: VMware LLC, Palo Alto, CA (US)

( * ) Notice: Subject to any disclaimer, the term of this patent is extended or adjusted under 35 U.S.C. 154(b) by 154 days.

(21) Appl. No.: 18/378,158

(22) Filed: Oct. 10, 2023

(65) Prior Publication Data

US 2025/0036746 A1 Jan. 30, 2025

(30) Foreign Application Priority Data

Jul. 24, 2023 (IN) .............................. 202341049838

(51) Int. Cl.
*G06F 21/45* (2013.01)
*G06F 9/455* (2018.01)

(52) U.S. Cl.
CPC .......... *G06F 21/45* (2013.01); *G06F 9/45558* (2013.01); *G06F 2009/45587* (2013.01)

(58) Field of Classification Search
CPC ................... G06F 21/45; G06F 21/46; G06F 2009/45587; G06F 9/45558
See application file for complete search history.

(56) References Cited

U.S. PATENT DOCUMENTS

| | | | | |
|---|---|---|---|---|
| 2010/0306773 A1* | 12/2010 | Lee | ........................ | G06F 9/5077 718/1 |
| 2022/0391490 A1* | 12/2022 | Maresh | ................. | H04L 63/083 |
| 2023/0231833 A1* | 7/2023 | Cook | ................... | H04L 63/0272 713/168 |
| 2024/0405980 A1* | 12/2024 | Chang | ................... | H04L 9/3247 |

* cited by examiner

*Primary Examiner* — Frantz B Jean
(74) *Attorney, Agent, or Firm* — King Intellectual Asset Management (57) ABSTRACT

Examples of the disclosure are directed to password management of virtual machines in a virtual machine environment. A password can be obtained that corresponds to a virtual machine. The password can be associated with a password identifier that is generated independent of a storage location of the files associated with the virtual machine. An operating system password vault can be utilized that stores the password and password identifier.

20 Claims, 4 Drawing Sheets

PASSWORD MANAGEMENT OF VIRTUAL MACHINES FOR MIGRATION SUPPORT

RELATED APPLICATIONS

Benefit is claimed under 35 U.S.C. 119(a)-(d) to Foreign application No. 202341049838 filed in India entitled "PASSWORD MANAGEMENT OF VIRTUAL MACHINES FOR MIGRATION SUPPORT", on Jul. 24, 2023, by VMware, Inc., which is herein incorporated in its entirety by reference for all purposes.

BACKGROUND

Virtual machines are often utilized in a desktop environment so that a user, such as a developer, can utilize virtual machines for various purposes. For example, a developer might require different permutations of processor, memory, and operating system to run in an environment to test code that the developer is writing. As another example, a user might require a virtual machine running a different operating system other than a host operating system to perform work tasks. For example, a Mac user might require a Windows, Linux or Kubernetes environment to develop code that is being deployed to customers or perform other work-related tasks.

A desktop environment can be provided in which a user can specify the configuration of a given virtual machine and save the configuration to the host operating system environment for later and subsequent use. The current or last working state of the virtual machine can also be saved for later use. However, security measures might be desired so that the state of the virtual machines is not accessible by other users of the host environment without appropriate credentials to do so.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

The present disclosure relates to r security of virtual machines (VMs) in a desktop or development environment. As outlined above, personal devices are being used to access enterprise applications, data, and other resources with greater frequency. The use of these personal devices can be associated with productivity gains and cost savings. The concept "bring your own device" (BYOD) for access to enterprise resources faces a number of issues, including the provision for offline access. Whether a device is provided by the enterprise or the end user, devices are more often operated from home and other locations that are remote from an enterprise local area network. Application delivery can be problematic for BYOD scenarios. Files and registry keys remain on a device, file type associations are not reverted properly, services and resources shared with other applications are incorrectly removed, services are not properly unregistered, application data and log files not removed, or an uninstallation process fails without proper completion. Re-installing the same application has issues with these leftover artifacts. This can be unacceptable for enterprise and end users alike. However, the present disclosure provides a more effective solution that can provide both greater flexibility and isolation for virtualized application delivery in enterprise environments.

Figure 1:
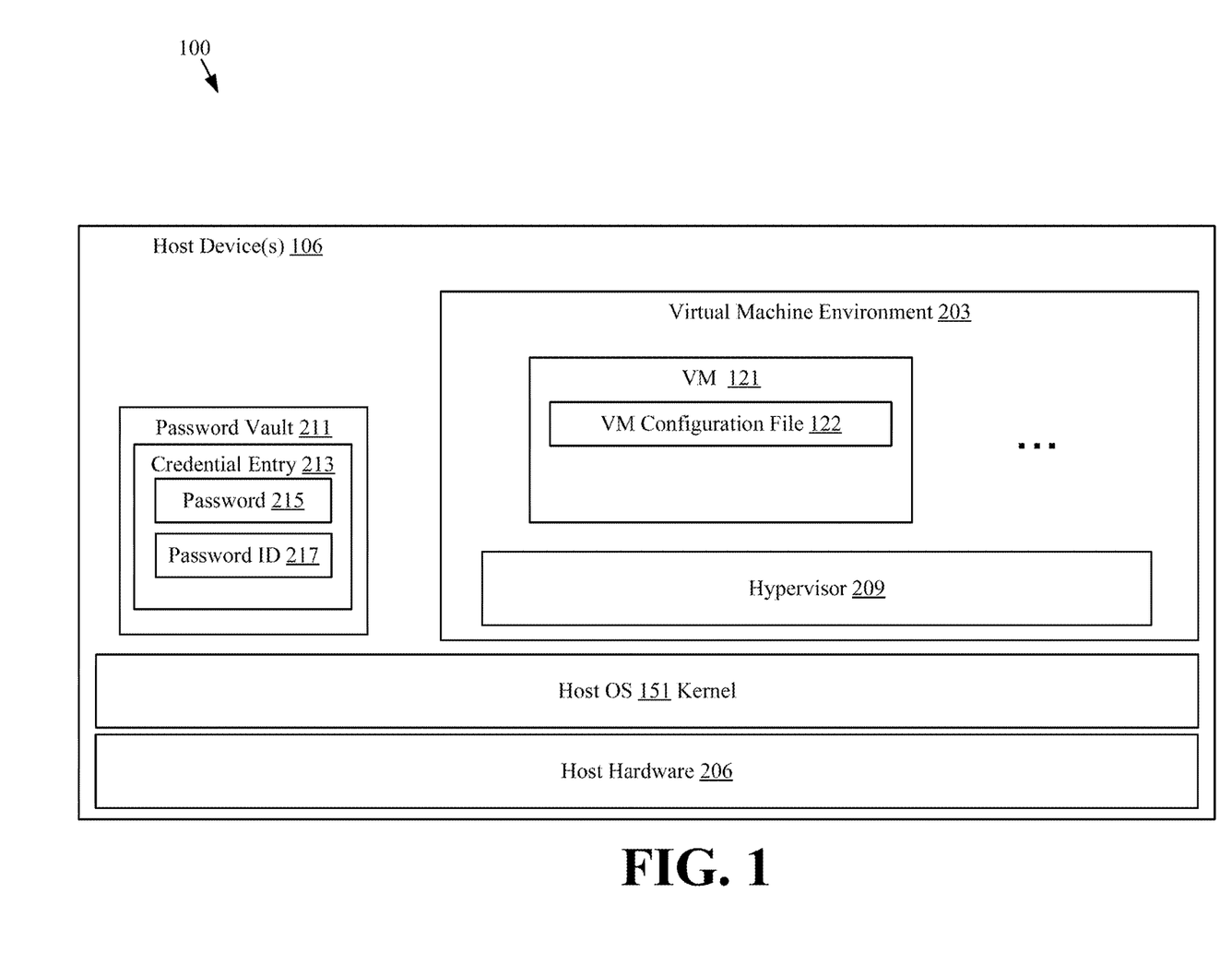
FIG. 1 illustrates an example networked environment for distributing and managing managed virtual machines and virtualized applications, according to various examples described herein.

Referring next to FIG. 1, shown in a host device 106, which can represent a computing device or system in which examples of the disclosure can be implemented. Other examples or representations of a computing device can also be utilized to implement and understand examples of the disclosure. A host device 106 can be representative of one or more computing device. A host device 106 can be embodied as any computing device, processing circuit, or processor based device or system, including those in the form of a desktop computer, a laptop computer, a tablet computer, a personal digital assistant, a cellular telephone, a wearable computing device, or a set-top box, among other example computing devices and systems. Depending upon its primary purpose or function, for example, the host devices 106 can include various peripheral devices or components. The peripheral devices can include input or communications devices or modules, such as keyboards, keypads, touch pads, touch screens, microphones, cameras, wireless communications modules (e.g., infra-red, WI-FI, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the host devices 106.

A host device 106 can be equipped with various hardware resources and capabilities that can be made available to applications running on the host device 106 by an operating system. For example, a networking capability can allow applications to communicate with a network interface to access the Internet, intranets, extranets, wide area networks (WANs), local area networks (LANs), wired networks, wireless networks, cable networks, satellite networks, other suitable networks, or any combinations thereof. As one example, the host device 106 can be coupled to one or more public or private LANs or WANs and, in turn, to the Internet for communication of data among each other.

The host device 106 can also include processor, mass storage, and memory resources that can be made available to applications. Accordingly, an application running on the host device 106 can access the hardware resources of the host device 106 through calls made to an operating system that manages the hardware resources of the host device 106. The hardware resources of the host device 106 are referred to herein as the host hardware 206. The operating system can also provide other software application programming interfaces and services, such as a password vault 211. A password vault 211 can comprise an operating system software service that permits applications and users of the host device 106 to store credentials, such as usernames, passwords, certificates, biometric credentials, and other information that can be protected by the operating system.

The password vault 211 can require a user to authenticate himself or herself to the operating system before providing access to credentials stored therein. The password vault 211 can comprise a database or data store can store various credential entries. In the context of this disclosure, a credential entry 213 can comprise a password 215 and a password identifier 217. A password 215 can comprise a user-generated or automatically generated password, passcode, passphrase, or other credential that can be utilized to secure or encrypt a virtual machine (VM). The VM can be secured or encrypted by a virtual machine environment.

By utilizing the password vault 211 provided by the operating system of the host device 106, the virtual machine environment 203 can provide password security without having to implement a user authentication feature or infrastructure within the virtual machine environment 203.

The host device 106 can execute a virtual machine environment 203, which can also include a hypervisor 209 that acts as a software layer that interacts with the operating system of the host device 106. The hypervisor 209 is an application or software stack that allows for creating and running virtual machines. Accordingly, a hypervisor 209 can be configured to provide guest systems with a virtual operating platform, including virtualized hardware devices or resources, and manage the execution of guest operating systems within a virtual machine execution space provided by the hypervisor 209. In some instances, a hypervisor 209 may be configured to run directly on the hardware of the host device 106 in order to control and manage the hardware resources of the host device 106 provided to the virtual machines resident on the host device 106. For example, the hypervisor 209 could be responsible for allocated time slices for the usage of a host GPU to virtual machines that request or require access to the resources of the GPU. In other instances, the hypervisor 209 can be implemented as an application executed by an operating system executed by the host device 106, in which case the virtual machines may run as a thread, task, or process of the hypervisor 209 or operating system. Depending on the implementation, the hypervisor 209 could provide full virtualization for system virtual machines, or operating-system level virtualization for isolated processes that act as virtual machines.

A VM 121 can represent software emulations of computer systems. Accordingly, a VM 121 can provide the functionality of a physical computer sufficient to allow for installation and execution of an entire operating system and any applications that are supported or executable by the operating system. As a result, a VM 121 can be used as a substitute for a physical machine to execute one or more processes. In full virtualization implementations, the VM 121 can be implemented as a system virtual machine that emulates a complete host. In operating-system virtualization implementations, the VM 121 can be implemented as an isolated user-space instance or process, which may be referred to as containers, zones, virtual environments, virtual kernels, or jails.

Within the virtual machine environment 203, a VM 121 can be associated with a VM configuration file 122. The VM configuration file 122 can contain configuration information regarding a particular VM 121. For example, the VM configuration file 122 can identify a processor and memory allocation, a type of GPU, an operating system that the VM 121 should execute, the mass storage resources of the VM 121, and other configuration data associated with a VM 121.

In the context of this disclosure, the VM configuration file 122 can be stored on the host device 106 outside of the virtual machine environment 203, such as in mass storage of the host device 106. The VM configuration file 122 can also store a password identifier that is generated based upon a password specified by a user for a password created by the user or automatically generated to protect or encrypt the VM 121.

A VM 121 can be protected or encrypted so that other users of the host device 106 are unable to access or execute the VM 121 without a password, passcode, or other type of credential. The virtual machine environment 203 can require the password to be provided at the time of accessing or execution of the VM 121. In examples of the disclosure, the virtual machine environment 203 can utilize a password vault 211 of the operating system to store a password associated with a VM 121. A credential entry 213 created by or on behalf of the virtual machine environment 203 can correspond to a particular VM 121. The credential entry 213 can include a password 215 for a particular VM 121 as well as a password identifier 217.

A password identifier 217 can be generated based upon the password 215 and represent a unique identifier, or in some cases a globally unique identifier, that is created using the password 215 as an input. In some cases, the unique identifier can be based upon a timestamp taken when the password 215 was set for the VM 121.

The virtual machine environment 203 can store the password 215 and the password identifier 217 in a credential entry 213 within the password vault 211. The password identifier 217 can be generated independently of a storage location of a VM 121 and its associated files on the host device 106. For example, a state of the VM 121, including the memory state, mass storage state, and other files needed to execute or resume the VM 121, can be stored on the host device 106. In some cases, the VM 121 can be associated with a directory or folder on the host device 106.

In some systems, when a password is stored in the password vault 211, it is stored with an identifier the VM 121 to which the password corresponds is identified by its configuration file path or using a hash that is generated using the configuration file path. Accordingly, if the VM 121 files or a configuration file is moved or copied to a different location the identifier in the password vault 211 identifying the VM 121 does not work. A migration operation could comprise moving the VM to a different location, coping the VM 121, exporting the VM 121. The migration operation can include exportin, importing, or cloning the VM 121 which changes the VM configuration file 122 path or the path of any other files associated with a VM 121.

According to examples of the disclosure, the virtual machine environment 203 can generate a password identifier 217 that is not based upon the file path of the VM configuration file 122, thereby breaking the binding between the password identifier 217 and the storage location of the VM configuration file 122 or the VM 121. Accordingly, if a user or other system changes the password 215, the virtual machine environment 203 can generate a new password identifier 217 that is stored along with the newly generated password 215 in the password vault 211. Additionally, the password identifier 217 can be stored in the VM configuration file 122 so that the virtual machine environment 203, when querying the password vault 211 for a password 215 corresponding to a particular VM 121, can utilize the password identifier 217 stored in the VM configuration file 122 to locate the correct credential entry 213 in the password vault 211 to retrieve the correct password 215 for the VM 121. In some examples, the password identifier 217 can be created based upon the password 215 at the time of encryption of a VM 121 within the virtual machine environment 203.

Figure 2:
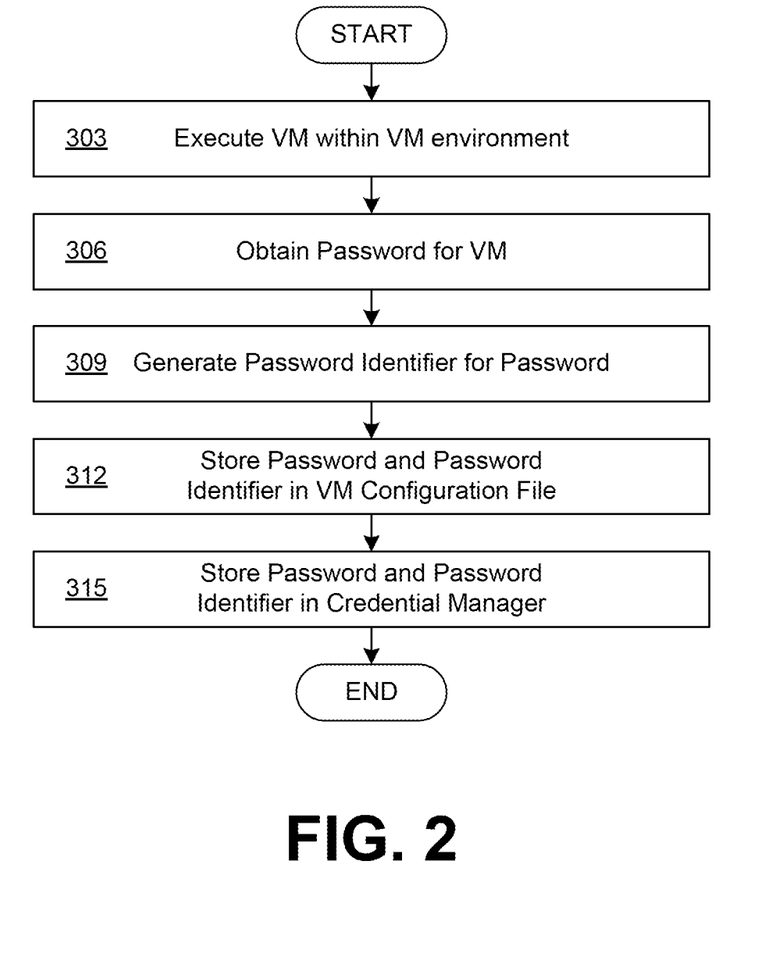
FIG. 2 illustrates an example of packaging a managed virtual machine package and provisioning the managed virtual machine with virtualized applications, according to various examples described herein.

FIG. 2 shows a flowchart performed by components of the virtual machine environment 203. Generally, the flowchart illustrates how the virtual machine environment 203 can generate a password identifier 217 and store the password identifier 217 in the password vault 211 of the operating system of the host device 106. The virtual machine environment 203 can also store the password identifier 217 in a VM configuration file 122 corresponding to a VM 121.

First, at step 303, the virtual machine environment 203 can execute a VM 121 within the virtual machine environment 203. The VM 121 can be configured by a user with a selected amount of memory, virtual processing resources, virtual graphics processing resources, mass storage resources, a selected guest operating system of the VM 121, and VM 121 properties. The configuration of the VM 121 that is selected by the user can be saved into a VM configuration file 122 by the virtual machine environment 203. The VM configuration file 122 can be saved into a folder or directory on the host device 106.

At step 306, the virtual machine environment 203 can obtain a password 215 for the VM 121. The password 215 can be specified by the user or generated by the virtual machine environment 203 or a password manager. The password 215 can be used to encrypt or otherwise secure the VM 121 so that users without the password 215 are unable to access or execute the VM 121 within the virtual machine environment 203.

At step 309, the virtual machine environment 203 can generate a password identifier 217 corresponding to the password 215 obtained at step 306. The password identifier 217 can be a hash of the password 215 or a globally unique identifier that is generated using the password 215 as an input. The password identifier 217 can be utilized as an encryption key or a seed to generate a key with which the VM 121 can be encrypted or otherwise secured.

At step 312, the virtual machine environment 203 can store the password identifier 217 in a VM configuration file 122 corresponding to the VM 121. By storing the password identifier 217 into the VM configuration file 122, the virtual machine environment 203 can query the password vault 211 for the correct password 215 by searching the password vault 211 with the password identifier 217. In this sense, the password identifier 217 can identify the VM 121 in the password vault 211 as well as the password 215.

At step 315, the virtual machine environment 203 can store the password 215 and the password identifier 217 in the password vault 211 in a credential entry 213. The credential entry 213 can represent an entry in the password vault 211 that is associated with the VM 121. Using the password identifier 217, again, the virtual machine environment 203 can query the password vault 211 for the correct password 215 by searching the password vault 211 with the password identifier 217. In this sense, the password identifier 217 can identify the VM 121 in the password vault 211 as well as the password 215. Thereafter, the process proceeds to completion.

Figure 3:
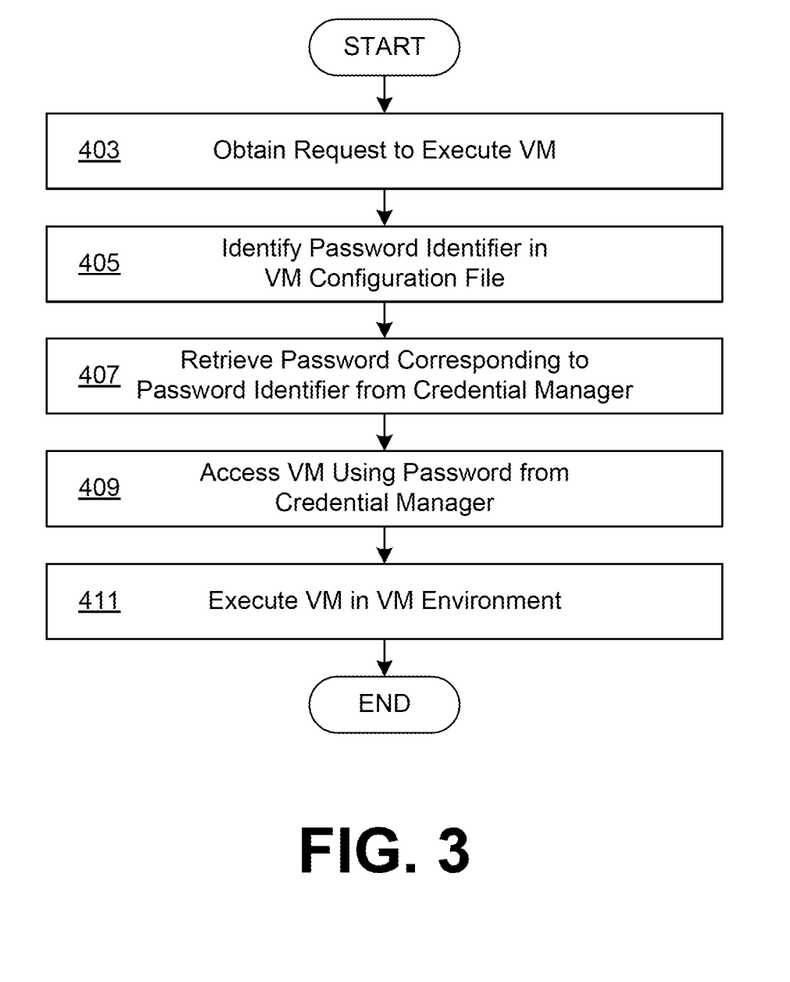
FIG. 3 illustrates a flowchart performed by components of the networked environment, according to various examples described herein.

FIG. 3 shows a flowchart performed by components of the virtual machine environment 203. Generally, the flowchart illustrates how the virtual machine environment 203 obtain a password identifier 217 from the password vault 211 of the operating system of the host device 106. The virtual machine environment 203 can utilize the password identifier 217 to obtain the password 215 for a VM 121 so that the virtual machine environment 203 can execute or access the VM 121.

First, at step 403, the virtual machine environment 203 can obtain a request to execute a VM 121 within the virtual machine environment 203. The request can be generated in response to a user attempting to access or execute the VM 121 in a user interface provided by the virtual machine environment 203 on the host device 106. The VM 121 can allow the user to utilize a VM 121 with a selected amount of memory, virtual processing resources, virtual graphics processing resources, mass storage resources, a selected guest operating system of the VM 121. The configuration of the VM 121 that is selected by the user can be retrieved from a VM configuration file 122 by the virtual machine environment 203. The VM configuration file 122 can indicate a password identifier 217 and/or whether the VM 121 is encrypted or secured by a password 215.

At step 405, the virtual machine environment 203 can identify a password identifier 217 in the VM configuration file 122. The password identifier 217 can be utilized by the virtual machine environment 203 to locate the password 215 for the VM 121 in the password vault 211.

At step 407, the virtual machine environment 203 can submit a request to the password vault 211 for a credential entry 213 in which the password identifier 217 is present. In other words, the virtual machine environment 203 can search the password vault 211 for the credential entry 213 containing the password 215 that corresponds to the password identifier 217 and to the VM 121. By utilizing the password vault 211 provided by the operating system, the virtual machine environment 203 need not implement its own password security of user authentication scheme, instead relying on the operating system for password security and user authentication. Examples of a password vault 211 provided by an operating system include the Windows® Credential Manager and MacOS® Keychain. In some implementations, a third party password vault 211 can be utilized that is not integrated into the operating system, such as a third party password or credential manager that runs as an application on the host device 106. The password vault 211 can provide the credential entry 213 containing the password 215 corresponding to the password identifier 217 to the virtual machine environment 203.

At step 409, the virtual machine environment 203 can access the VM 121 using the password 215 retrieved from the password vault 211. In one example, the virtual machine environment 203 can decrypt the VM 121 using the password 215 or a key derived from the password 215. In another example, the virtual machine environment 203 can simply require the password 215 in order to access the VM 121. At step 411, the virtual machine environment 203 can execute or otherwise access the VM 121. Thereafter, the process can proceed to completion.

Figure 4:
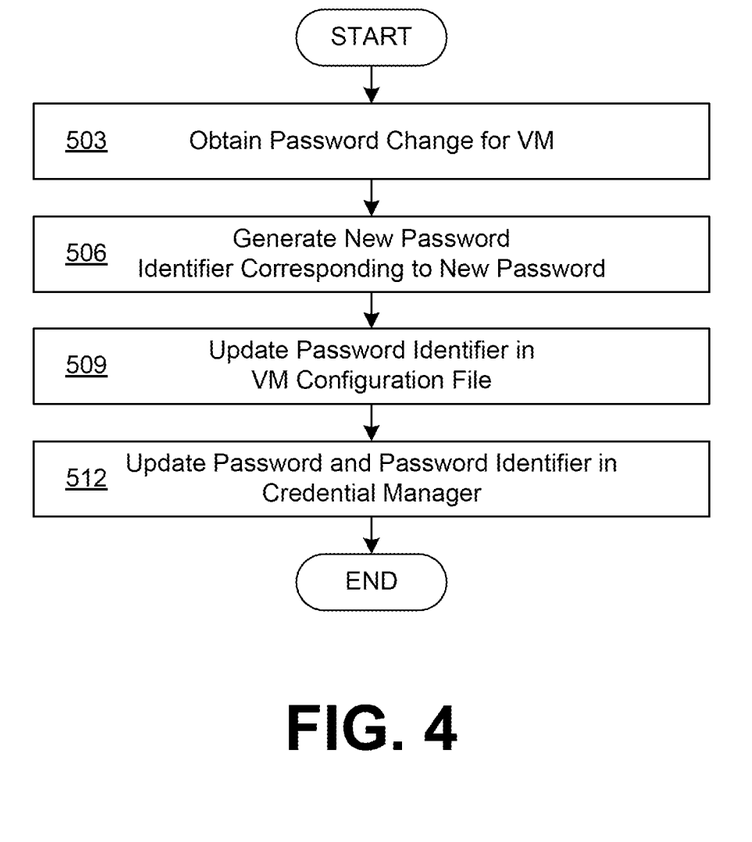
FIG. 4 illustrates another flowchart performed by components of the networked environment, according to various examples described herein.

FIG. 4 shows a flowchart performed by components of the virtual machine environment 203. Generally, the flowchart illustrates how the virtual machine environment 203 can update a password identifier 217 in the password vault 211 of the operating system of the host device 106 in response to a change of a password 215 corresponding to a VM 121.

First, at step 503, the virtual machine environment 203 can obtain a password change for a password 215 corresponding to a VM 121 in the virtual machine environment 203. The password change can comprise a new password that is obtained from a user or automatically generated by the virtual machine environment 203 or another application.

At step 506, the virtual machine environment 203 can generate a new password identifier 217 corresponding to the password 215 obtained in step 503. The password identifier 217 can be a hash of the password 215 or a globally unique identifier that is generated using the password 215 as an input. The password identifier 217 can be utilized as an encryption key or a seed to generate a key with which the VM 121 can be encrypted or otherwise secured.

At step 509, the virtual machine environment 203 can store or update the password identifier 217 in a VM configuration file 122 corresponding to the VM 121. By storing the password identifier 217 into the VM configuration file 122, the virtual machine environment 203 can query the password vault 211 for the correct password 215 by searching the password vault 211 with the password identifier 217. In this sense, the password identifier 217 can identify the VM 121 in the password vault 211 as well as the password 215.

At step 512, the virtual machine environment 203 can store the password 215 and the password identifier 217 in the password vault 211 in a credential entry 213. The credential entry 213 can represent an entry in the password vault 211 that is associated with the VM 121. Using the password identifier 217, again, the virtual machine environment 203 can query the password vault 211 for the correct password 215 by searching the password vault 211 with the password identifier 217. In this sense, the password identifier 217 can identify the VM 121 in the password vault 211 as well as the password 215. Thereafter, the process proceeds to completion.

The flowchart(s) and sequence diagram(s) show examples of the functions and operation of the components described herein. The components described herein can be embodied in hardware, software, or a combination of hardware and software. If embodied in software, each element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or several interconnected circuits that implement the specified logical function(s).

The computing environment 103 can include at least one processing circuit. Such a processing circuit can include, for example, one or more processors and one or more storage or memory devices that are coupled to a local interface. The local interface can include, for example, a data bus with an accompanying address/control bus or any other suitable bus structure. Similarly, the host devices 106 can each include at least one processing circuit. Such a processing circuit can include, for example, one or more processors and one or more storage or memory devices that are coupled to a local interface.

The storage or memory devices can store data or components that are executable by the processors of the processing circuit. For example, the management service 120 and/or other components can be stored in one or more storage devices and be executable by one or more processors in the networked environment 100. Similarly, the agents, services, applications and/or other components described herein can be stored in one or more storage devices and be executable by one or more processors in the host device 106.

The management service 120 and/or other components described herein can be embodied in the form of hardware, software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the management service 120 and/or other components can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Certain embodiments as described above involve a hardware abstraction layer on top of a host computer. The hardware abstraction layer allows multiple containers to share the hardware resource. These containers, isolated from each other, have at least a user application running therein. The hardware abstraction layer thus provides benefits of resource isolation and allocation among the containers. In the foregoing embodiments, virtual machines are used as an example for the containers and hypervisors as an example for the hardware abstraction layer. As described above, each virtual machine includes a guest operation system in which at least one application runs. It should be noted that these embodiments may also apply to other examples of containers, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The embodiments described herein can employ various computer-implemented operations involving data stored in computer systems. For example, these operations can require physical manipulation of physical quantities-usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method implemented by instructions executed by at least one computing device, the method comprising:
   executing, within a host device comprising a host operating system, a virtual machine comprising a guest operating system and the host device executes a virtual machine environment in which the virtual machine executes;
   obtaining, within the virtual machine environment on the host device, a password for securing the virtual machine;
   generating, within the virtual machine environment, a virtual machine configuration file for the virtual machine;
   generating, within the virtual machine environment, a password identifier corresponding to the password and the virtual machine;
   storing, within the virtual machine environment, the password identifier in the virtual machine configuration file; and
   storing, by the virtual machine environment, the password and the password identifier in a password vault provided by the host operating system.

2. The method of claim 1, further comprising:
obtaining, within the virtual machine environment, a request to execute the virtual machine;
identifying, within the virtual machine environment, the password identifier corresponding to the virtual machine in the configuration file corresponding to the virtual machine;
identifying, in the password vault provided by the host operating system, the password identifier identified in the virtual machine configuration file;
retrieving, from the password vault provided by the host operating system, the password corresponding to the password identifier;
accessing, within the virtual machine environment, the virtual machine using the password retrieved from the password vault provided by the hots operating system.

3. The method of claim 1, further comprising:
receiving, within the virtual machine environment, a request to modify the password corresponding to the virtual machine to a new password;
generating, within the virtual machine environment, a new password identifier corresponding to the new password; and
updating, within the virtual machine environment, the virtual machine configuration file with the new password identifier.

4. The method of claim 1, wherein the password identifier is generated independent of and without a storage location of the virtual machine configuration file as an input.

5. The method of claim 1, wherein the password identifier comprises a globally unique identifier.

6. The method of claim 1, further comprising encrypting, by the virtual machine environment, the virtual machine based upon the password.

7. The method of claim 1, further comprising:
generating, by the virtual machine environment, a copy of the virtual machine, wherein the copy of the virtual machine is secured using the password.

8. A non-transitory computer-readable medium embodying instructions executable by at least one computing device wherein the instructions, when executed, cause the at least one computing device to at least:
execute, within a host device comprising a host operating system, a virtual machine comprising a guest operating system and the host device executes a virtual machine environment in which the virtual machine executes;
obtain a password for securing the virtual machine;
generate a virtual machine configuration file for the virtual machine;
generate a password identifier corresponding to the password and the virtual machine;
store the password identifier in the virtual machine configuration file; and
store the password and the password identifier in a password vault provided by the host operating system.

9. The non-transitory computer-readable medium of claim 8, wherein when executed, the instructions further cause the at least one computing device to at least:
obtaining, within the virtual machine environment, a request to execute the virtual machine;
identifying, within the virtual machine environment, the password identifier corresponding to the virtual machine in the configuration file corresponding to the virtual machine;
identifying, in the password vault provided by the host operating system, the password identifier identified in the virtual machine configuration file;
retrieving, from the password vault provided by the host operating system, the password corresponding to the password identifier;
accessing, within the virtual machine environment, the virtual machine using the password retrieved from the password vault provided by the hots operating system.

10. The non-transitory computer-readable medium of claim 8, wherein when executed, the instruction further cause the at least one computing device to at least:
receive a request to modify the password corresponding to the virtual machine to a new password;
generate a new password identifier corresponding to the new password; and
update the virtual machine configuration file with the new password identifier.

11. The non-transitory computer-readable medium of claim 8, wherein the password identifier is generated independent of and without a storage location of the virtual machine configuration file as an input.

12. The non-transitory computer-readable medium of claim 8, wherein the password identifier comprises a globally unique identifier.

13. The method according to claim 8, wherein when executed, the instructions further cause the at least one computing device to at least encrypt the virtual machine based upon the password.

14. The method according to claim 8, wherein when executed, the instructions further cause the at least one computing device to at least generate a copy of the virtual machine, wherein the copy of the virtual machine is secured using the password.

15. A system, comprising:
at least one computing device; and
instructions accessible by the at least one computing device, wherein when executed the instructions cause the at least one computing device to at least:
execute, within a host device comprising a host operating system, a virtual machine comprising a guest operating system and the host device executes a virtual machine environment in which the virtual machine executes;
obtain a password for securing the virtual machine;
generate a virtual machine configuration file for the virtual machine;
generate a password identifier corresponding to the password and the virtual machine;
store the password identifier in the virtual machine configuration file; and
store the password and the password identifier in a password vault provided by the host operating system.

16. The system of claim 15, wherein when executed, the instructions further cause the at least one computing device to at least:
obtaining, within the virtual machine environment, a request to execute the virtual machine;
identifying, within the virtual machine environment, the password identifier corresponding to the virtual machine in the configuration file corresponding to the virtual machine;
identifying, in the password vault provided by the host operating system, the password identifier identified in the virtual machine configuration file;
retrieving, from the password vault provided by the host operating system, the password corresponding to the password identifier; and accessing, within the virtual machine environment, the virtual machine using the password retrieved from the password vault provided by the hots operating system.

17. The system of claim 15, wherein when executed the instructions further cause the at least one computing device to at least:
receive a request to modify the password corresponding to the virtual machine to a new password;
generate a new password identifier corresponding to the new password; and
update the virtual machine configuration file with the new password identifier.

18. The system of claim 15, wherein the password identifier is generated independent of and without a storage location of the virtual machine configuration file as an input.

19. The system of claim 18, wherein when executed, the instructions further cause the at least one computing device to at least encrypt the virtual machine based upon the password.

20. The system of claim 19, wherein when executed, the instructions further cause the at least one computing device to at least generate a copy of the virtual machine, wherein the copy of the virtual machine is secured using the password.

* * * * *